June 17, 1930.  R. PULLER  1,764,414
VOLTAGE CONTROL SYSTEM
Filed July 6, 1927
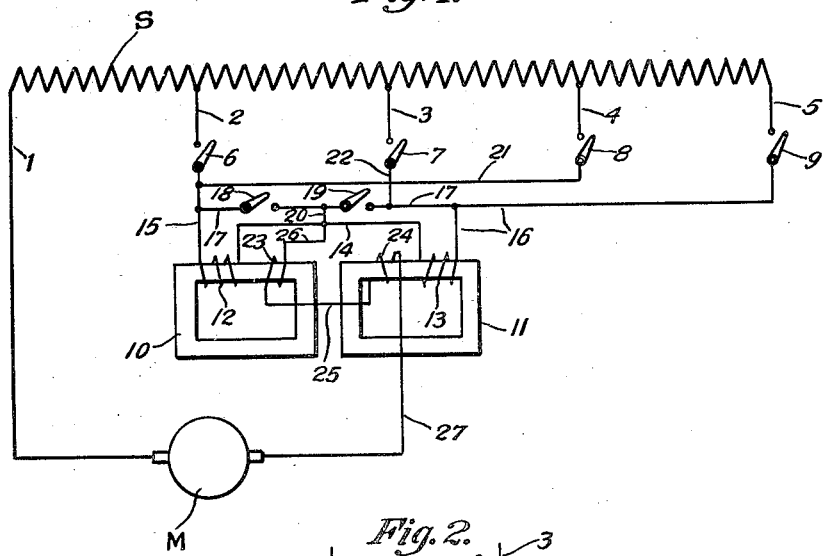
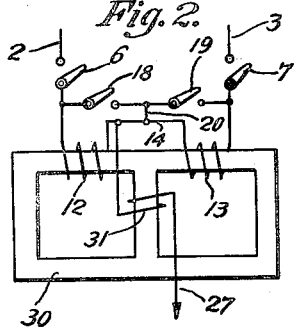
WITNESSES:
Paul J. Loesch
Lyman D. Oberlin.
INVENTOR
Rudolf Puller
BY
Wesley G. Carr
ATTORNEY Patented June 17, 1930

1,764,414

UNITED STATES PATENT OFFICE

RUDOLF PULLER, OF BERLIN-SIEMENSSTADT, GERMANY, ASSIGNOR TO WESTINGHOUSE ELECTRIC & MANUFACTURING COMPANY, A CORPORATION OF PENNSYLVANIA

VOLTAGE-CONTROL SYSTEM

Application filed July 6, 1927, Serial No. 203,776, and in Germany July 6, 1926.

My invention relates to a voltage control system, and has particular reference to a circuit-controlling arrangement for obtaining a large number of different magnitudes of voltage in proportion to the number of switches and taps that are utilized.

It is characteristic of my invention that a step-by-step winding of a transformer is utilized in conjunction with a plurality of windings connected in series in an additive sense, together with one or more windings inductively related to said first named windings, a suitable switching arrangement serving to connect all of the windings in different and suitable relations with respect to each other.

My invention resides in the system and combination of parts of the character hereinafter described and claimed.

For an illustration of some of the forms my invention may take, reference is to be had to the accompanying drawing, in which Figure 1 is a diagrammatic view of a voltage control system constructed in accordance with my invention.

Fig. 2 is a diagrammatic view of a modified form of voltage control system.

Referring to Figure 1, there is illustrated a secondary coil or winding S to which the conductors 1, 2, 3, 4 and 5 are conductively related. As shown, conductors 1 and 5 are connected to the respective terminals of the aforesaid winding S, while the conductors 2, 3 and 4 are so connected to said winding S, that the portions thereof between adjacent conductors are substantially equal. Coacting with the terminals of the respective conductors 2, 3, 4 and 5, are the circuit breakers or switches 6, 7, 8 and 9.

A plurality of stationary auxiliary transformers 10 and 11, in the example shown, comprise, respectively, primary coils or windings 12 and 13 connected in series in an additive sense. To this end, the proper terminals of the windings 12 and 13 are connected together by a conductor 14. The other terminal of winding 12 is connected by a conductor 15 to the aforesaid switch 6, while the other terminal of winding 13 is connected to the switch 9 by a conductor 16. A conductor 17 is connected to the conductors 15 and 16 and interposed therein are the switches 18 and 19, utilizable, when closed, for short circuiting the respective windings 12 and 13. In order that this action may be effected, a conductor 20 branches from the aforesaid conductor 17 intermediate the switches 18 and 19 and is connected to the conductor 14 which, as stated, is connected to terminals of the windings 12 and 13.

The switches 6 and 8 should be conductively related to the same terminal of winding 12 and, hence, the last named switch has connected thereto a conductor 21 connected either to the conductor 17 or the conductor 15. Likewise, the switches 7 and 9 should be connected to the same terminal of winding 13 and, hence, the first named switch has connected thereto a conductor 22 leading either to the conductor 16 or the conductor 17.

Disposed, respectively, on the cores of transformers 10 and 11 are the coils or windings 23 and 24 forming, in the example shown, secondary windings for the transformers. Windings 23 and 24 should be connected in series and should oppose each other, whereby their voltages are in opposition when the windings 12 and 13 are energized. To this end, the proper terminals of windings 23 and 24 are connected together by a conductor 25. The other free end of winding 23, in the example shown, is connected by a conductor 26 to the aforesaid conductor 14 which, as stated, is conductively related to the conductor 17 intermediate the switches 18 and 19. The other free end of winding 24, in the example shown, is connected by a conductor 27 to one terminal of a suitable energy-consuming device, as a motor M, the other terminal of which is connected to the aforesaid conductor 1.

Assuming that $po$ is the voltage across that section of winding S between the conductors 1 and 2 and that $p$ is the voltage across each of the remaining sections of winding S, and that the windings 23 and 24, when energized, each produce a voltage corresponding to one fourth the voltage between adjacent conductors 2, 3, 4 and 5, the following voltages may be obtained with the connections indicated:

| Switches closed | Step number | Voltage |
|---|---|---|
| 6 and 18 | 1 | $p_o$ |
| 6, 18 and 7 | 2 | $p_o+p/4$ |
| 6 and 7 | 3 | $p_o+p/2$ |
| 6, 19 and 7 | 4 | $p_o+3p/4$ |
| 19 and 7 | 5 | $p_o+p$ |
| 8, 19 and 7 | 6 | $p_o+5p/4$ |
| 8 and 7 | 7 | $p_o+3p/2$ |
| 8, 18 and 7 | 8 | $p_o+7p/4$ |
| 8 and 18 | 9 | $p_o+2p$ |
| 9 and 19 | etc. to 13 | $p_o+3p$ |

In general, three intermediate voltages may be obtained between adjacent taps, and it follows, therefore, that if $n$ taps and $n+2$ switches are present, there are $n+3(n-1)$ or $4n-3$ different voltage steps.

In the form of our invention illustrated in Fig. 2, there is utilized a single core 30 in lieu of the cores 10 and 11 illustrated in Fig. 1. Core 30 comprises three legs, and the primary coils 12 and 13 are suitably positioned thereon. However, in Fig. 2, a single secondary coil 31 is provided instead of the secondary coils 23 and 24 of Fig. 1.

With the construction illustrated in Fig. 2, upon closing the switches 6 and 7, no voltage will be provided by the secondary coil 31, while upon closing switch 6 alone, the flux will traverse the leg of the transformer having the coil 31 mounted thereon in an opposite direction than if the switch 7 alone is closed. The action of the coil 31, therefore, is additive in the first case and subtractive in the second case, and under otherwise similar conditions, the same voltage steps may be obtained with the construction illustrated in Fig. 2 as specified in the above noted table.

It shall be understood that on the core 30, a plurality of secondary coils may be provided, which coils are similar to the coil 31. However, the arrangement as illustrated in Fig. 2, is simpler and ordinarily sufficient for the intended purpose, since the coil 31 is energized alternately only by the primary coils 12 and 13 and is never energized simultaneously thereby.

It shall also be understood that the individual voltage steps of the main transformer need not necessarily be equal to each other. Furthermore, it is preferable that the ratio of transformation in both auxiliary transformers be the same, and such ratio may desirably partake of the value of 4:1; this may be varied, however, if found desirable. The disclosed arrangement utilizing equal voltage steps and a ratio of transformation of the value just specified is particularly desirable in that all of the voltage steps differ from each other by the same value. However, it shall be understood that my invention is not limited in this respect.

Although my invention has been illustrated in connection with the secondary winding, as winding S, of a transformer, it shall be understood that the disclosed arrangements may be utilized in connection with the primary winding of such a transformer, or otherwise, as may be desirable.

I claim as my invention:

1. The combination with a source of electromotive force, of means comprising circuit-interrupting devices for deriving from said source a plurality of different magnitudes of electromotive force, a connection comprising a plurality of windings connected in series in an additive sense with each other and with said circuit-interrupting devices, means for eliminating one of said windings from said connection, and a winding coacting with the windings of said connection and conected to the latter.

2. The combination with a source of electromotive force, of means comprising circuit-interrupting devices for deriving from said source a plurality of different magnitudes of electromotive force, a connection comprising a plurality of windings connected in series in an additive sense with each other and with said circuit-interrupting devices, means for eliminating either of said windings from said connection, and a winding coacting with the windings of said connection and connected to the latter.

3. The combination with a source of electromotive force, of means comprising circuit-interrupting devices for deriving from said source a plurality of different magnitudes of electromotive force, a connection comprising a plurality of windings connected in series in an additive sense with each other and with said circuit-interrupting devices, means for eliminating one of said windings from said connection, a winding coacting with the windings of said connection and connected to the latter, and an energy-consuming device connected to said last named winding and to said source of electromotive force.

In testimony whereof, I have hereunto subscribed my name this 22nd day of June, 1927.

RUDOLF PULLER.